US006565159B1

United States Patent
Kosak

(10) Patent No.: US 6,565,159 B1
(45) Date of Patent: May 20, 2003

(54) ALUMINUM WHEEL CARRIER AND SPINDLE ASSEMBLY

(75) Inventor: Werner E. Kosak, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/002,194

(22) Filed: Oct. 25, 2001

(51) Int. Cl.[7] .............................................. B60B 35/00
(52) U.S. Cl. .................... 301/132; 301/35.632; 29/520; 403/280; 403/282; 280/124.125
(58) Field of Search ...................... 301/35.626, 35.632, 301/131, 132, 135, 64.701, 64.702, 64.703, 124.1; 29/520, 505; 403/279, 280, 282; 280/93.512, 124.125

(56) References Cited

U.S. PATENT DOCUMENTS

| 3,746,399 | A | * | 7/1973 | Verdier ......................... 301/65 |
| 3,908,480 | A | | 9/1975 | Afandor et al. |
| 4,002,286 | A | | 1/1977 | Simon |
| 4,223,903 | A | | 9/1980 | Grabb et al. |
| 4,416,564 | A | * | 11/1983 | Billet et al. .................. 403/282 |
| 4,545,601 | A | | 10/1985 | Muller et al. |
| 4,728,216 | A | * | 3/1988 | Disborg ......................... 403/282 |
| 4,768,839 | A | * | 9/1988 | Spindler .................. 301/131 X |
| 4,828,328 | A | | 5/1989 | Bowman |
| 5,145,204 | A | | 9/1992 | Perkins |
| 5,158,390 | A | * | 10/1992 | Ito et al. ....................... 403/282 |
| 5,281,005 | A | | 1/1994 | Babcock et al. |
| 5,401,079 | A | * | 3/1995 | Rooney .............. 301/64.701 X |
| 5,785,332 | A | * | 7/1998 | Pollock et al. ......... 280/124.125 |
| 5,833,026 | A | | 11/1998 | Zetterström et al. |
| 5,868,409 | A | * | 2/1999 | Breuer ................... 280/93.512 |
| 5,938,292 | A | | 8/1999 | Aaron, Jr. et al. |
| 6,138,357 | A | | 10/2000 | Jones |
| 6,196,639 | B1 | | 3/2001 | Di Ponio et al. |
| 6,299,259 | B1 | * | 10/2001 | MacKarvich ............ 301/132 X |

\* cited by examiner

Primary Examiner—Russell D. Stormer
(74) Attorney, Agent, or Firm—MacMillan, Sobanski & Todd, LLC

(57) ABSTRACT

A wheel assembly for a vehicle comprises a spindle and a wheel carrier. The spindle includes a shank portion and a shoulder portion. The shank portion includes a press-fit portion adjacent the shoulder portion and has a first predetermined diameter. The wheel carrier is adapted to be supported by a suspension system of the vehicle, is comprised of aluminum, and has a spindle-receiving bore therethrough. The bore has an initially-formed diameter smaller than the first predetermined diameter. The press-fit portion is press-fit into the bore. The difference between the initially-formed diameter and the first predetermined diameter is sufficiently large that the press-fit portion is surrounded by a deformation zone having a radial thickness of at least 10 microns. In one preferred embodiment, this deformation zone is comprised of plastically deformed aluminum having a radial thickness of at least 3 microns.

18 Claims, 6 Drawing Sheets

ALUMINUM WHEEL CARRIER AND SPINDLE ASSEMBLY

BACKGROUND OF THE INVENTION

This application is related to concurrently filed U.S. application Ser. No. (23336), entitled "Spindle Mounting for Aluminum Wheel Carrier".

The present invention relates in general to spindles for wheel mounting in automotive vehicles, and, more specifically, to the attachment of cast iron or steel spindles to cast aluminum wheel carriers.

The use of lightweight materials in automotive vehicles is desired wherever possible in order to help increase fuel economy. Thus, the use of aluminum instead of iron or steel in vehicle suspension components is of increasing interest to vehicle manufacturers. However, the material properties of aluminum can be very different from those of iron or steel, meaning that aluminum cannot be directly substituted in every component in a straightforward way.

A vehicle suspension includes a spindle to which a wheel hub is mounted. The spindle is mounted to a wheel carrier such as a knuckle, axle, or other component. Due to strength and heat transfer requirements, the spindle is typically made of steel or iron. Prior art spindles have previously been made as an integral forging/casting with their carrier or have been mounted to their carriers by threading or welding, for example.

Another method for mounting a spindle has been to press-fit the spindle into a bore on the wheel carrier. The interference between the spindle and the bore (i.e., the bore diameter is slightly less than the spindle diameter) creates an elastic deformation force against the spindle to retain it.

One hurdle in the possible use of aluminum castings for wheel carriers has been the lack of an easy method to attach the spindle. Prior art mounting methods have been unsuccessful due to the distinct properties of steel/iron versus aluminum, such as different thermal properties and aluminum's different elastic deformation.

SUMMARY OF THE INVENTION

The present invention adapts a press-fit method of attachment for an iron or steel spindle to an aluminum wheel carrier, resulting in overall weight savings for a vehicle. As used herein, "aluminum" includes any alloy principally comprised of aluminum.

In one aspect of the invention, a wheel assembly for a vehicle comprises a spindle and a wheel carrier. The spindle includes a shank portion and a shoulder portion. The shank portion includes a press-fit portion adjacent the shoulder portion and has a first predetermined diameter. The wheel carrier is adapted to be supported by a suspension system of the vehicle. It is comprised of aluminum and has a spindle-receiving bore therethrough. The bore has an initially-formed diameter smaller than the first predetermined diameter. The press-fit portion is press-fit into the bore. The difference between the initially-formed diameter and the first predetermined diameter is sufficiently large that the press-fit portion is surrounded by a deformation zone having a radial thickness of at least 10 microns. In one preferred embodiment, this deformation zone is comprised of both plastically and elastically deformed aluminum.

DETAILED DESCRIPTION OF PREFERRED EMBODIMENTS

Figure 1:
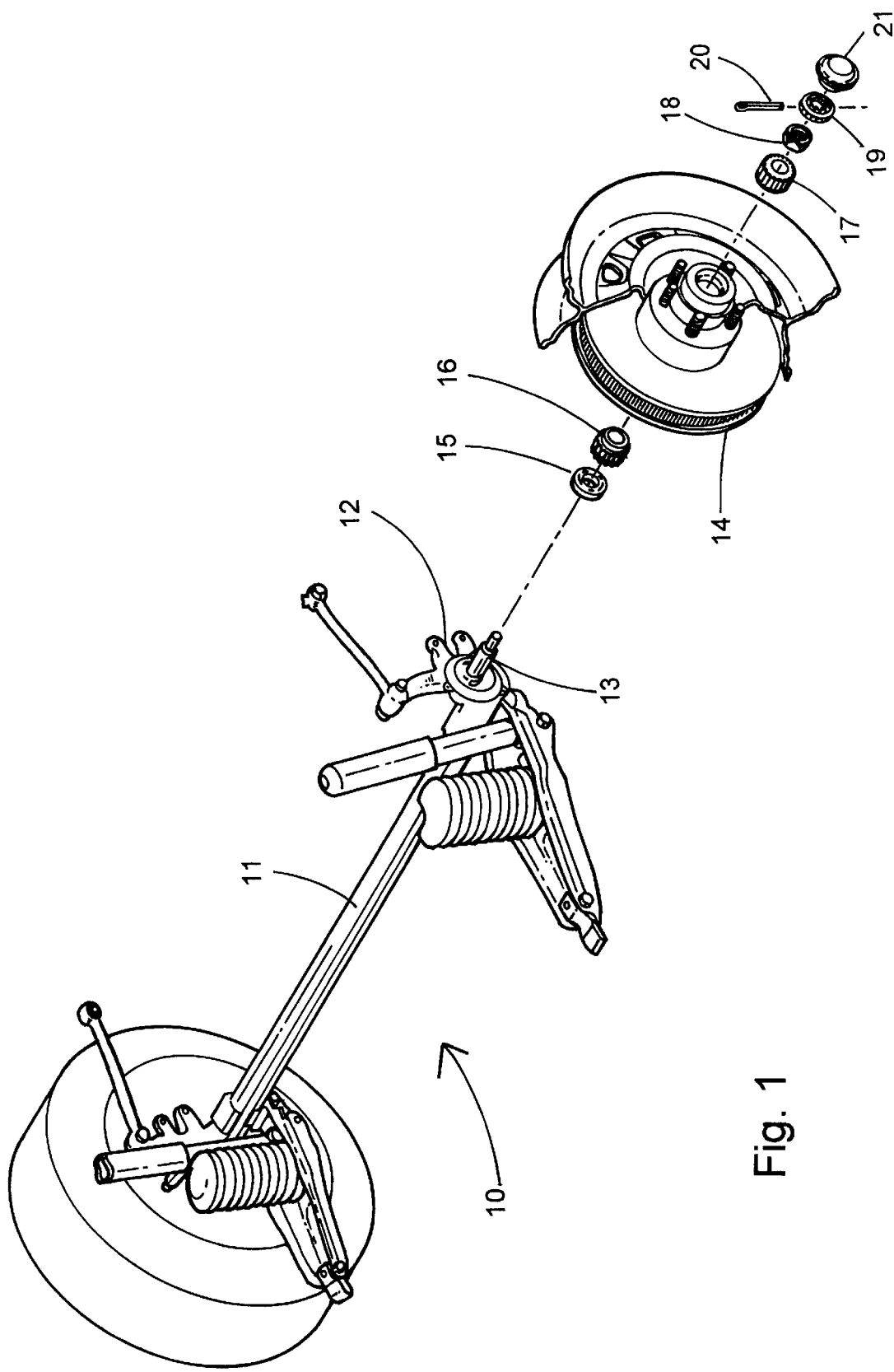
FIG. 1 is an exploded, perspective view of a portion of a suspension system including a wheel carrier and spindle.

Referring to FIG. 1, a suspension system 10 includes a dead axle 11 having a wheel carrier 12 mounted thereto. Wheel carrier 12 supports a spindle 13. A wheel hub 14 is mounted to spindle 13 by means of a grease seal 15, bearings 16 and 17, an adjusting nut 18, a nut retainer 19, a cotter pin 20, and a grease cap 21. The mounting of the spindle must be sufficiently robust to absorb the road loads through the wheels and distribute them to the suspension system.

Figure 2:
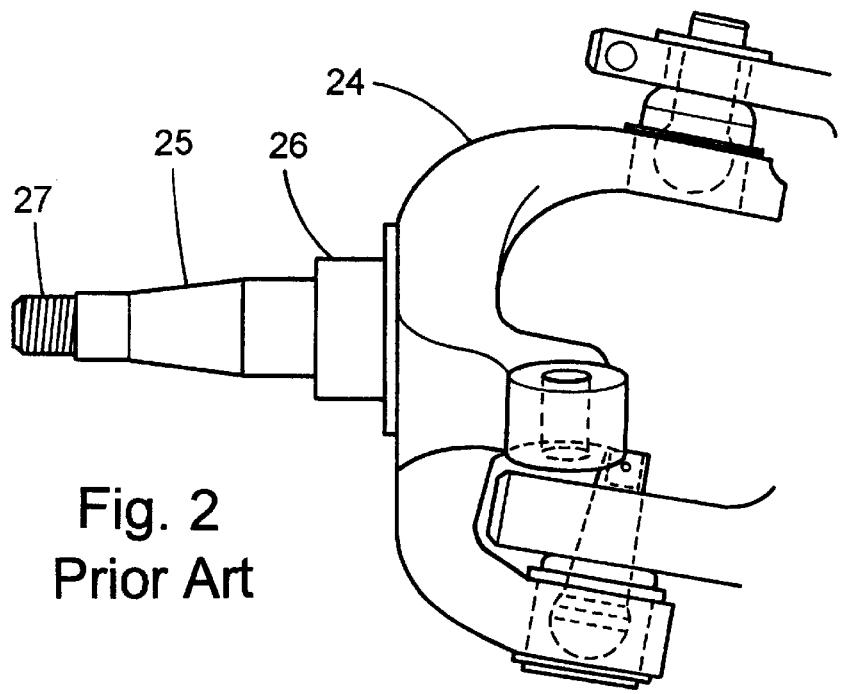
FIG. 2 is a side view of a prior art spindle mounted to a knuckle.

FIG. 2 shows a prior art steel knuckle 24 mounted by ball joints to an axle. A steel spindle 25 is attached to knuckle 24 via a collar 26 on knuckle 24. Spindle 25 may have provisions for bolting it to knuckle 24 or the two may be welded or press-fit together, for example. Spindle 25 has a threaded end 27 for retaining a wheel hub.

In prior art mounting of spindles by press-fitting into a bore in an iron or steel wheel carrier, the elasticity of the wheel carrier facilitated the connection. Since the deformation was elastic, the spindle could even be removed and replaced with good retention. However, elastic deformation of aluminum is so slight that insufficient interference could be created to provide a secure locking of the spindle.

The present invention goes beyond elastic deformation of the zone surrounding the bore. Instead, an interference amount is selected that creates a plastically deformed zone of predetermined thickness along with an elastically deformed zone. Plastic deformation advantageously hardens the contacting aluminum while maintaining sufficient retention forces against the spindle.

Figure 3:
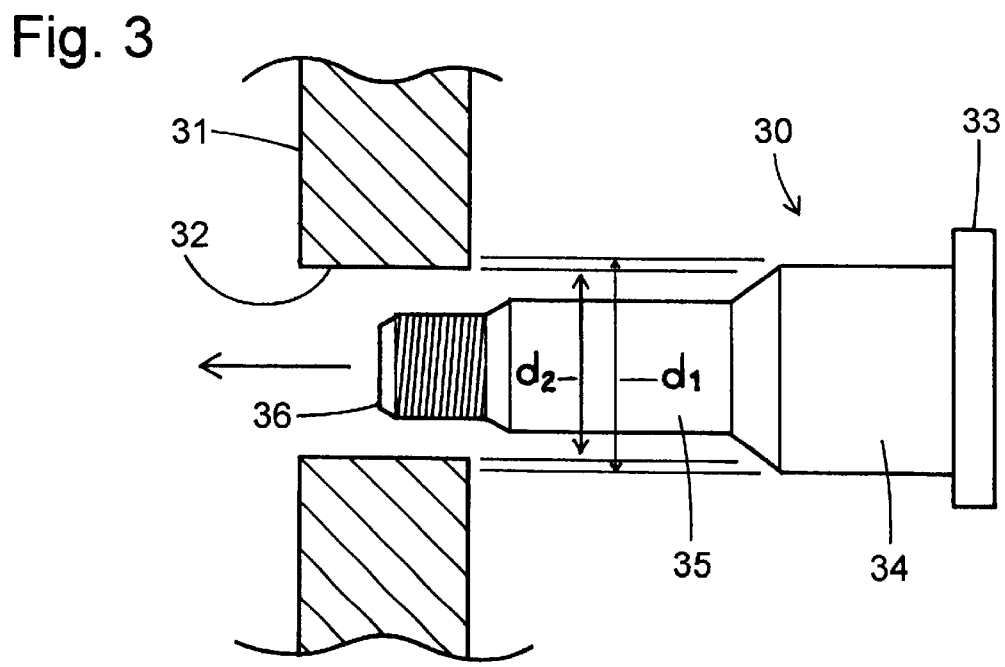
FIG. 3 is a side, partial cross section of a spindle of the present invention prior to press-fitting onto a wheel carrier.

FIG. 3 shows a spindle 30 which is made of ferrous material, such as steel or iron. A wheel carrier 31 comprised of aluminum (e.g., an aluminum alloy) is shown in cross section to have a spindle-receiving bore 32. Spindle 30 is comprised of a shoulder 33 and then a shank having a press-fit portion 34, a wheel mount portion 35, and a threaded end 36. Press-fit portion 34 has a first predetermined diameter $d_1$ and bore 32 has an initial diameter $d_2$ which is smaller than first predetermined diameter $d_1$. Upon insertion of spindle 30 into bore 32, the difference in diameters creates an interference between press-fit portion 34 and the portion of wheel carrier 31 surrounding bore 32.

Figure 4:
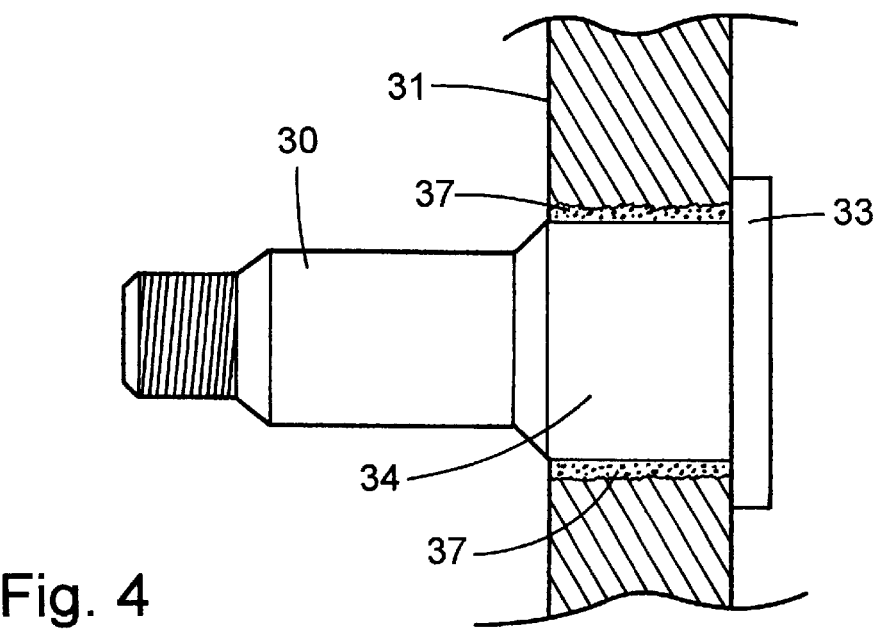
FIG. 4 is a side, partial cross section of the spindle of FIG. 3 after press-fitting.

FIG. 4 shows spindle 30 after being driven into bore 32 until shoulder 33 contacts wheel carrier 31. Press-fit portion 34 has plastically deformed wheel carrier 31 to create a cylindrical deformation zone 37. To create an appropriately sized deformation zone 37, the difference in diameters is preferably in the range of about 20 microns or more. This creates a plastic deformation zone having a thickness of at least about 3 microns. Thus, the total deformation zone consists of both a plastic deformation region and an elastic deformation region. Plastic deformation corresponds to the increased diameter of bore 32 if spindle 30 were to be removed after deformation.

Figure 5:
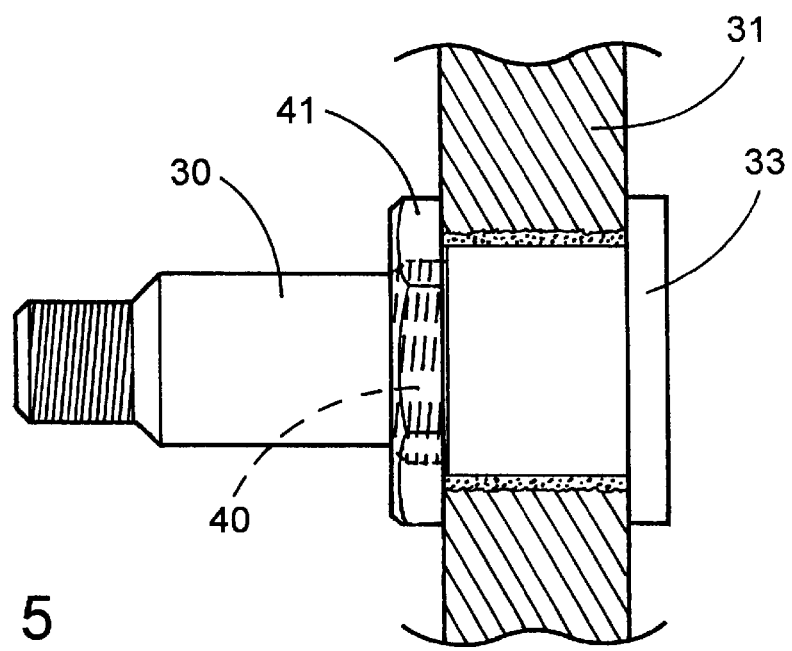
FIG. 5 is a side, partial cross section of a press-fit spindle with a supplemental threaded nut.

If desired, the axial retention of the spindle can be further improved as shown in FIG. 5 by adding an intermediate threaded portion 40 on spindle 30 and engaging a nut 41 such that spindle 30 is clamped to wheel carrier 31 between nut 41 and shoulder 33.

Figure 6:
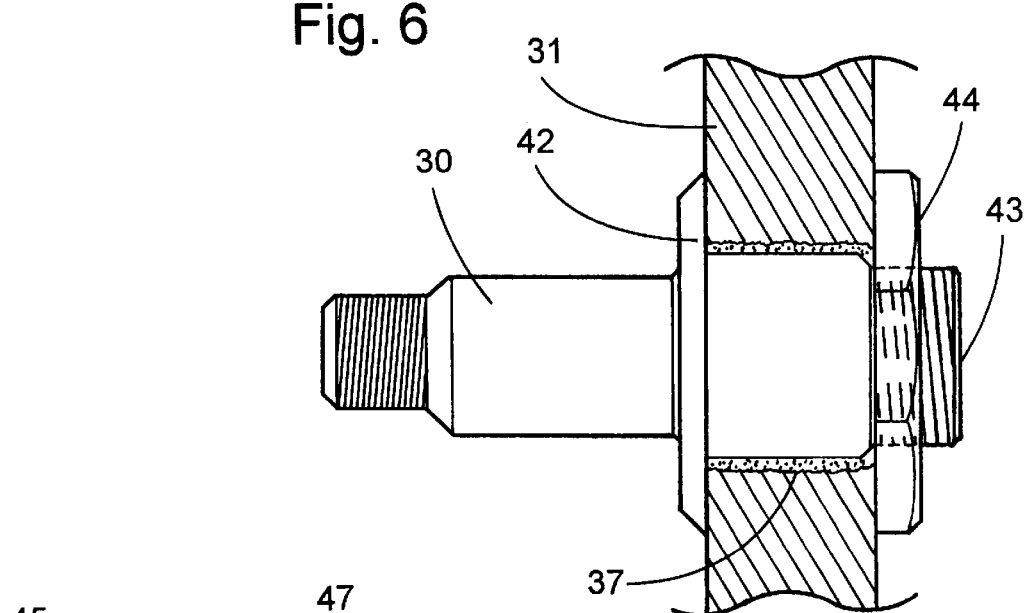
FIG. 6 is a side, partial cross section of an alternative embodiment of a press-fit spindle with a supplemental threaded nut.

In an embodiment shown in FIG. 6, shoulder 42 is located at the intermediate portion of spindle 30. In this embodiment, spindle 30 is press-fit into wheel carrier 31 in a direction opposite to that shown in FIG. 3. Axial retention can again be supplemented using a second threaded end 43 engaged by a nut 44.

Figure 7:
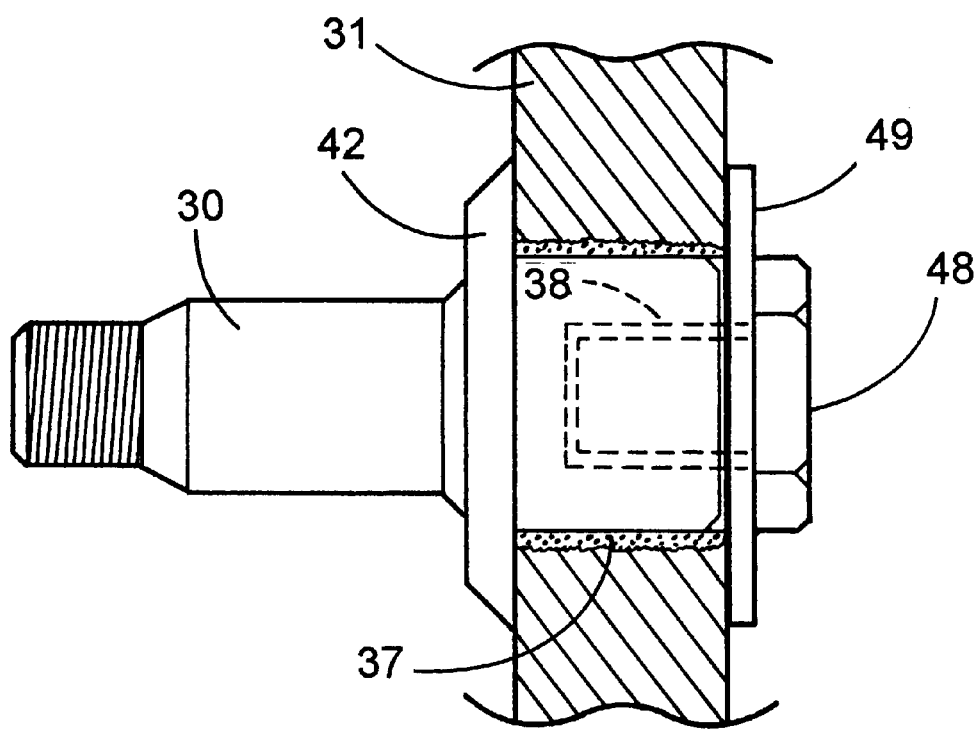
FIG. 7 is a side, partial cross section of an alternative embodiment of a press-fit spindle with a bolt threaded into the spindle for supplemental attachment.

FIG. 7 shows an alternative embodiment of the supplemental attachment using a bolt. Spindle 30 includes an axial threaded bore 38 as shown. A bolt 48 and washer 49 are fastened to spindle 30 to supplementally clamp spindle 30 to wheel carrier 31 between shoulder 42 and washer 49.

Figure 8:
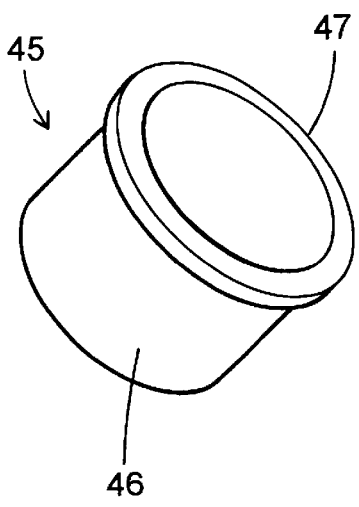
FIG. 8 is a perspective view of a sleeve insert used in alternative embodiment.

In another alternative embodiment, the present invention employs a non-aluminum insert 45 shown in FIG. 8. Preferably, insert 45 is made of steel, iron or sintered material. Insert 45 is placed within the bore in the wheel carrier and the spindle is then press-fit against the insert. Insert 45 includes a sleeve 46 and a collar 47. Sleeve 46 has an inside diameter corresponding to the desired interference as already described. The outside diameter of sleeve 46 corresponds to the diameter of an enlarged bore in the wheel carrier. Collar 47 serves to keep sleeve 46 from being ejected from the bore during press-fitting of the spindle.

Figure 9:
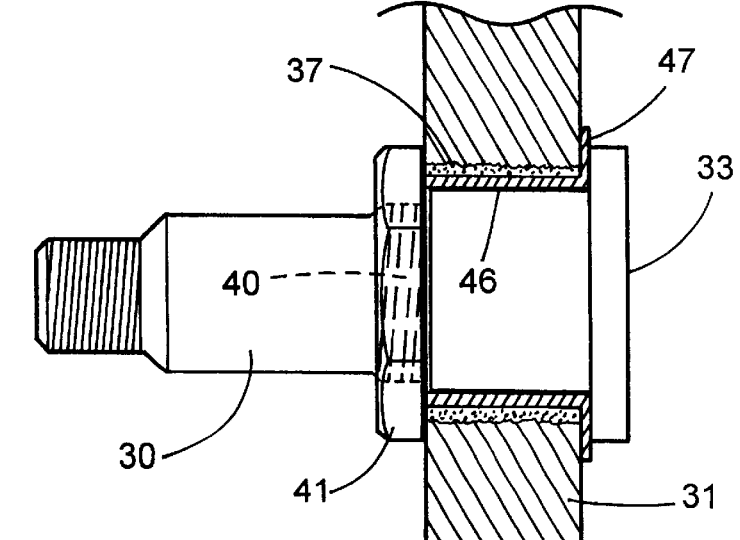
FIGS. 9, 10, and 11, are side, partial cross sections of spindle mounting using various embodiments of sleeve inserts.

As shown in FIG. 9, after press-fitting into sleeve 46, deformation of sleeve 46 can still result in plastic deformation of aluminum wheel carrier 31. This embodiment can also be supplemented with threaded portion and nut 41, if, desired.

Figure 10:
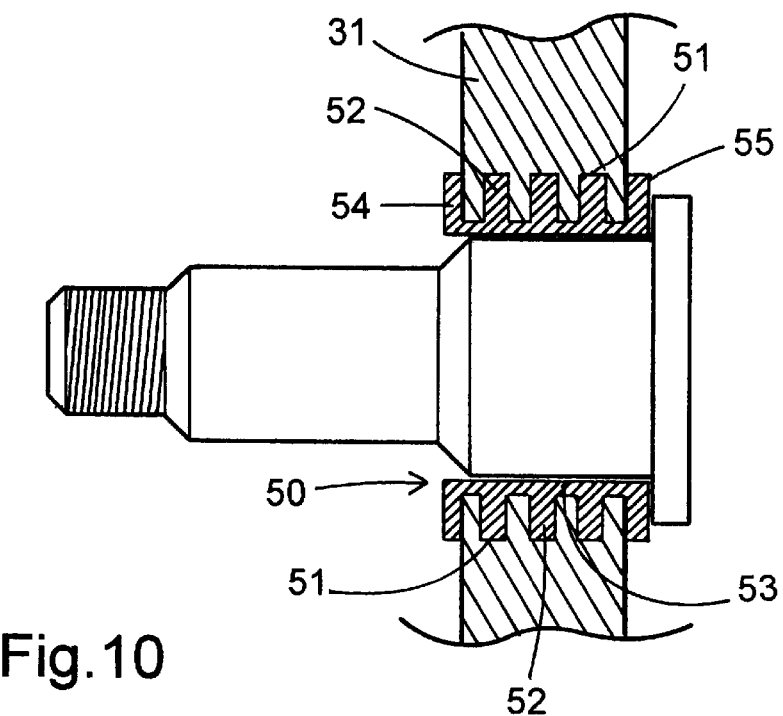

FIG. 10 shows an alternative embodiment of an insert 50 which is molded in place over aluminum wheel carrier 31. A plurality of recesses 51 are formed with an increased diameter within a bore having a diameter sized to receive insert 50. Steel, iron, or sinter is molded in place to form fingers 52 occupying recesses 51 and a sleeve 53 having an interfering diameter with spindle 30. Insert 50 may also include collars 54 and 55. The radial thickness of sleeve 53 can be kept small so that aluminum wheel carrier 31 plastically deforms or can be made large enough that its own elastic deformation absorbs all the interference.

Figure 11:
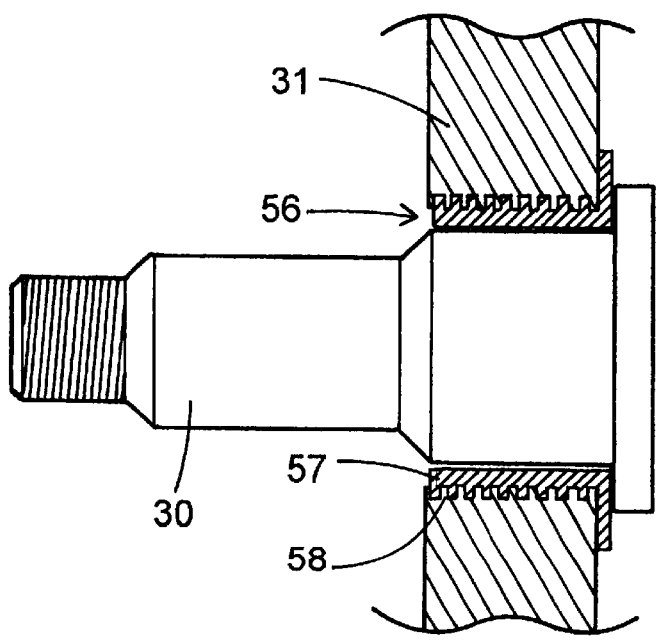

Yet another alternative embodiment is shown in FIG. 11. A threaded insert 56 includes threads 57 on its outer surface. The bore in wheel carrier 31 includes matching threads 58. Insert 56 is threaded into wheel carrier 31 prior to press-fitting spindle 30 into the insert.

What is claimed is:

1. A wheel assembly for a vehicle, comprising:
    a spindle including a shank portion and a shoulder portion, said shank portion including a press-fit portion adjacent said shoulder portion and having a first pre-determined diameter; and
    a wheel carrier adapted to be supported by a suspension system of said vehicle, said wheel carrier comprised of aluminum and having a spindle-receiving bore therethrough, said bore having an initially-formed diameter smaller than said first predetermined diameter;
    wherein said press-fit portion is press-fit into said bore, and wherein a difference between said initially-formed diameter and said first predetermined diameter is sufficiently large that said press-fit portion is surrounded by a deformation zone having a radial thickness of at least 10 microns.

2. The wheel assembly of claim 1 wherein said deformation zone is comprised of plastically-deformed aluminum.

3. The wheel assembly of claim 2 wherein said shank portion further includes a threaded portion, said wheel assembly further comprising a fastener engaging said threaded portion to clamp said aluminum wheel carrier between said fastener and said shoulder portion.

4. The wheel assembly of claim 1 wherein said shank portion further includes a threaded portion, said wheel assembly further comprising a fastener engaging said threaded portion to clamp said aluminum wheel carrier between said fastener and said shoulder portion.

5. The wheel assembly of claim 1 wherein said spindle is comprised of steel.

6. The wheel assembly of claim 1 wherein said aluminum wheel carrier further comprises a sleeve defining said spindle-receiving bore, said sleeve being substantially non-aluminum.

7. The wheel assembly of claim 6 wherein said sleeve includes a shoulder bearing against said aluminum wheel carrier.

8. The wheel assembly of claim 7 wherein said sleeve has cylindrical inside and outside surfaces and wherein said aluminum wheel carrier adjacent said outside cylindrical surface is plastically deformed by said press-fit of said spindle into said sleeve.

9. The wheel assembly of claim 6 wherein said shank portion further includes a threaded portion, said wheel assembly further comprising a fastener engaging said threaded portion to clamp said aluminum wheel carrier between said fastener and said shoulder portion.

10. A wheel assembly for a vehicle, comprising:
    a spindle including a shank portion and a shoulder portion, said shank portion including a press-fit portion adjacent said shoulder portion and having a first predetermined diameter;
    a wheel carrier adapted to be supported by a suspension system of said vehicle, said wheel carrier comprised of aluminum and having a sleeve-receiving bore therethrough; and
    a sleeve formed of a non-aluminum metal and integrally molded over said sleeve-receiving bore of said aluminum wheel carrier, said sleeve having a spindle-receiving bore therethrough, said spindle-receiving bore having a second predetermined diameter which is slightly less than said first predetermined diameter;
    wherein said press-fit portion of said spindle is received in said spindle-receiving bore of said sleeve in an interference fit therewith.

11. The wheel assembly of claim 10 wherein said sleeve is cast onto said aluminum.

12. A wheel assembly for a vehicle, comprising:
    a spindle including a shank portion and a shoulder portion, said shank portion including a press-fit portion adjacent said shoulder portion and having a first predetermined diameter;
    a wheel carrier adapted to be supported by a suspension system of said vehicle, said wheel carrier comprised of aluminum and having a threaded sleeve-receiving bore therethrough; and a sleeve formed of a non-aluminum metal and having a threaded outer surface which is threadably secured to said threaded sleeve-receiving bore of said aluminum wheel carrier, said sleeve having a spindle-receiving bore therethrough, said spindle-receiving bore having a second predetermined diameter which is slightly less than said first predetermined diameter;

wherein said press-fit portion of said spindle is received in said spindle-receiving bore of said sleeve in an interference fit therewith.

13. A wheel assembly for a vehicle, comprising:

a steel spindle including a shank portion and a shoulder portion, said shank portion including a press-fit portion adjacent said shoulder portion and having a first predetermined diameter; and an aluminum wheel carrier adapted to be supported by a suspension system of said vehicle, said aluminum wheel carrier having a spindle-receiving bore therethrough, said spindle-receiving bore having an initially-formed diameter smaller than said first predetermined diameter of press-fit portion of said spindle in the range of about 20 microns or more;

wherein when said press-fit portion of said spindle is press-fit into said spindle-receiving bore of said aluminum wheel carrier the difference between said initially-formed diameter and said first predetermined diameter creates a plastic deformation zone of plastically-deformed aluminum having a thickness of at least about 3 microns.

14. The wheel assembly of claim 13 wherein said shank portion further includes a threaded portion, said wheel assembly further comprising a fastener engaging said threaded portion to clamp said aluminum wheel carrier between said fastener and said shoulder portion.

15. The wheel assembly of claim 13 wherein said aluminum wheel carrier further comprises a sleeve defining said spindle-receiving bore, said sleeve being substantially non-aluminum.

16. The wheel assembly of claim 15 wherein said sleeve includes a shoulder bearing against said aluminum wheel carrier.

17. The wheel assembly of claim 16 wherein said sleeve has cylindrical inside and outside surfaces and wherein said aluminum wheel carrier adjacent said outside cylindrical surface is plastically deformed by said press-fit of said spindle into said sleeve.

18. The wheel assembly of claim 15 wherein said shank portion further includes a threaded portion, said wheel assembly further comprising a fastener engaging said threaded portion to clamp said aluminum wheel carrier between said fastener and said shoulder portion.

\* \* \* \* \*